United States Patent [19]

Goel et al.

[11] Patent Number: 4,708,971

[45] Date of Patent: Nov. 24, 1987

[54] BICYCLIC AMIDE ACETAL/POLYISOCYANATE POLYMERS

[75] Inventors: Anil B. Goel, Worthington; Timothy A. Tufts, Columbus, both of Ohio

[73] Assignee: Ashland Oil, Inc., Ashland, Ky.

[21] Appl. No.: 850,647

[22] Filed: Apr. 11, 1986

[51] Int. Cl.$^4$ ............................................. C08G 18/30
[52] U.S. Cl. .................................. 521/167; 524/397; 524/590; 524/710; 524/729; 524/751; 524/753; 524/754; 524/755; 524/773; 524/774; 524/775; 524/792; 524/795; 528/59; 528/73; 528/60; 548/218
[58] Field of Search ................ 521/167; 524/590, 710, 524/729, 751, 753, 754, 755, 773, 774, 775, 792, 795, 397; 528/59, 73, 60; 548/218

[56] References Cited

U.S. PATENT DOCUMENTS 4,001,165  1/1977  Olstowski ............................ 524/792
4,558,113  12/1985  Goel ...................................... 528/59
4,584,363  4/1986  Goel et al. ............................ 528/73
4,600,796  7/1986  Goel .

*Primary Examiner*—Maurice J. Welsh
*Assistant Examiner*—S. A. Acquah
*Attorney, Agent, or Firm*—John F. Jones

[57] ABSTRACT

The process for preparing polyurethanes by the reaction of a bicyclic amide acetal and a polyisocyanate in the presence of a plasticizer such as dioctyl phthalate and a polyurethane catalyst such as stannous octoate is described.

5 Claims, No Drawings

BICYCLIC AMIDE ACETAL/POLYISOCYANATE POLYMERS

This invention relates to a process for preparing improved rapid setting polymers by the reaction of bicyclic amide acetals with polyisocyanates in the presence of certain plasticizer additivies such as carboxylic acid esters, trialkyl phosphites and phosphates, alkylene carbonates, lactones oxazolidones and the like and to the polyurethane products produced thereby.

The reaction of certain bicyclic amide acetals with certain polyisocyanates to produce polymeric products at high temperatures has been reported in West German Patent Publication No. 3,235,933. The preparation of polymers from the reaction of mixtures of bicyclic amide acetals with polyisocyanates to give improved polymers has been disclosed in U.S. Pat. No. 4,558,113. The use of plasticizers to give improved rapid setting polymers in the reaction of bicyclic amide acetals with polyisocyanates has not previously been disclosed.

We have discovered that the inclusion of certain plasticizers such as carboxylic acid esters, trialkyl phosphites, trialkyl phosphates, alkylene carbonates, lactones and the like in the polymerization of bicyclic amide acetals with polyisocyanates results in rapid setting polymers having significantly improved properties.

Although the reacton of certain bicyclic amide acetals with certain polyisocyanates to produce solid polymers at elevated temperatures has been described in the West German Patent Publication No. 3,325,933, the polymers have been found to be very brittle containing bubbles. Reactions of polyols with polyisocyanates when carried out in bulk generally result in high exotherms which causes partial decomposition of the polymers and produces bubbles in the casting. Use of certain plasticizers in the polymerization of polyols with polyisocyanates to give rapid setting polyurethane polymers free from bubbles have been the subject of a large number of patents (U.S. Pat. Nos. 3,378,511; 3,726,827; 3,883,456; and 3,886,102, for instance). These patents generally recommend the use of organotin catalysts over the tertiary amine catalysts in the polyurethane formation reaction.

The present invention relates to a process for preparing solid, tough, rapid setting polymeric compositions providing desirable advantages and improvements such as bubble free, rapid setting uniform polymers having improved physical properties such as one or more of the properties including impact strength, flexural yield strength and flexural modulus.

The ingredients required in the process of this invention include four essential components, namely, component A-bicyclic amide acetal, component B-polyisocyanate, component C-plasticizer additive more fully described below, and component D-polyurethane catalyst also more fully described below.

The bicyclic amide acetals useful in this invention include those conforming to the Formula I (component A)

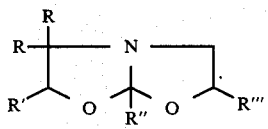

Wherein R, R', R" and R''' independently represent hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 20 carbon atoms.

Component B, the polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are included in this invention.

The functionality of the bicyclic amide acetal towards the isocyanate group is 2.

Component C for use in the process of this invention is a member selected from the group consisting of carboxylic acid esters, organic phosphites, organic phosphates, alkylene carbonates, lactones, fatty oils, cyclic polyethers, aromatic compounds free from ester groups, partially hydrogenated aromatic compounds free from ester groups, halogenated aliphatic compounds boiling above 150° C. and the like.

Compound D for use in the process of this invention are organometallic catalysts such as a stannous carboxylate or dibutyltin dilaurate and tertiary amine catalysts wherein components A and B are present in quantities so as to provide an isocyanate to amide acetal equivalent ratio of from about 0.8:1 to about 3:1. Component C may be present in quantities of from about 2 to 50, and preferably from about 5 to 40% by weight of the sum of components A, B and C. The catalyst component D may be present in quantities of from 0.01 to about 5 and preferably from 0.05 to about 2% by weight of the sum of components A, B and C. The process of this invention can be carried out at a temperature in the range of from about ambient to about 200° C.

More specific aromatic compounds which can be employed as component C in the process of this invention include straight chain and branched chain aliphatic, alkoxy and halogen substituted benzenes, aromatic substituted benzene and aromatic ethers, such as propenyl benzene, propylbenzene, butylbenzene, ethyltoluene, butyltoluene, propyltoluene, diphenyl oxide, biphenyl, o-, m- and p-diethylbenzene, dodecylbenzene, octadecylbenzene, bromobenzene, 1-bromo-3-chlorobenzene, 1-bromo-4-fluorobenzene, 1-bromo-2-iodobenzene, 1-bromo-3-chlorobenzene, 1-bromo-4-fluorobenzene, o-dibromobenzene, m-dibromobenzene, 1,3-dipropoxybenzene, 1-ethyl-4-propylbenzene, 1-fluoro-4-iodobenzene, 4-bromo-o-xylene, alpha-bromo-m-xylene, 4-bromo-m-xylene, alpha-chloro-m-xylene, 4-ethyl-m-xylene, 5-ethyl-m-xylene, 2-bromo-p-xylene, alpha-chloro-m-xylene, 2-ethyl-p-xylene, o-bromotoluene, m-bromotoluene, o-, m- and p-chlorotoluene, tertiary butyl styrene, alpha-bromostyrene, beta-bromostyrene, alpha-chlorostyrene, beta-chlorostyrene, and mixtures thereof.

Other suitable aromatic compounds which can be employed as the liquid modifier compound (component C) in the present invention include liquid multi-ring compounds having a boiling point above about 150 degrees C. such as 1-chloronaphthalene, 1-bromonaphthalene, and mixtures thereof. Suitable partially hydrogenated multi-ring aromatic compounds which may be used include 1,4-dihydronaphthalene, 1,2,3,4-tetrahydronaphthalene, and mixtures thereof. Also useful are naturally occurring fatty oils having boiling points above about 150 degrees C. including linseed oil, castor oil, tung oil, fish oil, soya oil and the like.

Suitable organophosphorus compounds which may be employed in component C include organo phosphates, organo phosphites and organo phosphonates having boiling points above about 150 degrees C. Organo phosphates, phosphites and phosphonates which are employed as the liquid modifier compound include those liquid compounds represented by the following formulas II, III and IV, respectively.

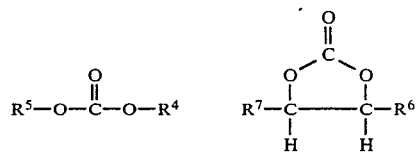

II  III  IV wherein $R^1$, $R^2$ and $R^3$ are independently selected from the group consisting of an alkyl group having from 1 to 10 carbon atoms, an aryl group having from 6 to 12 carbon atoms, an alkaryl group having from 7 to 20 carbon atoms, an aralkyl group having from 7 to 20 carbon atoms and halogenated derivatives thereof, Y is oxygen or sulfur and n has a value of 1 or 2. Suitable compounds of this type include tri-n-butyl phosphate, triethyl phosphate, tricresylphosphate, tris-(beta-chloroethyl) phospate, tris-(2,3-dibromopropyl) phosphate, tris(2-chloroethyl) phosphite, tributyl phosphite, tricresyl phosphite, triethyl phosphité, diethyl isoamyl phosphonate, diethyl ethyl phosphonate, dimethyl methyl phosphonate, diethyl methyl phosphonate, diisobutyl isobutyl phosphonate and bis(2-bromopropyl)-2-bromopropane phosphonate.

Suitable liquid organic carbonates which are useful as component C in this invention include the acyclic and cyclic carbonates represented by the following Formulas, V and VI,

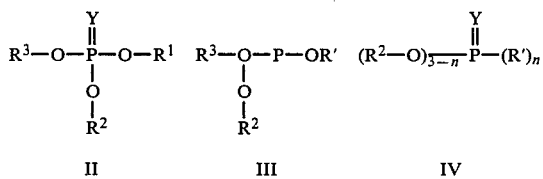

V  VI wherein $R^4$ and $R^5$ independently represent an aryl group having from 6 to 12 carbon atoms, an alkyl group having from 1 to 6 carbon atoms and substituted derivatives thereof and $R^6$ and $R^7$ independently represent hydrogen and the other groups represented by $R^4$ and $R^5$. Representative liquid acyclic organic carbonates which are useful in this invention include bis(2-chloroethyl carbonate), di-n-butyl carbonate, butyldiglycol carbonate, cresyldiglycol carbonate, dibutyl carbonate, di-2-ethylhexyl carbonate, dimethallyl carbonate, dinonyl carbonate and the like. The organic acyclic carbonates, Formula V, can be prepared by procedures given in U.S. Pat. No. 2,687,425, for instance. Suitable liquid cyclic organic carbonates Formula VI, include propylene carbonate, butylene carbonate, styrene carbonate, and mixtures thereof. The cyclic organic carbonates may be prepared in the manner described in Canadian Pat. No. 556,006.

Suitable cyclic polyethers which can be used in the present invention as component C include the cyclic tetramer of ethylene oxide, the cyclic pentamer of propylene oxide, the cyclic tetramer of propylene oxide, and mixtures thereof. Any liquid cyclic polyether having a boiling point above about 150 degrees C. may be employed including the cyclic polyethers prepared from butylene oxide, epichlorohydrin and the like. The liquid cyclic polyethers can be prepared by procedures disclosed in "Cyclic Polyethers and Their Complexes with Metal Salts" by C. J. Pedersen, J. Am. Chem Soc., Vol. 89, 7017–7036, 1968, "Twelve-Membered Polyether Rings. The Cyclic Tetramers of Some Olefin Oxides" by R. S. Kern, J. Org. Chem., Vol. 33, 388–390, 1986 and in British Pat. Nos. 785,229 and 1,108,921.

Suitable cyclic sulfones which can be used as component C in this invention include the 5-membered cyclic sulfones such as 3-methylsulfolane (3-methytetrahydrothiophene-1,1-dioxide) and the like.

Suitable esters of carboxylic acids which can be used as component C in this invention include those esters prepared from mono- and polycarboxylic acids having from 1 to 20 carbon atoms such as the esters of phthalic acid, adipic acid, acetoacetic acid, formic acid, acetic acid, abietic aid and the like wherein the ester portion can contain from 1 to 20 carbon atoms such as methyl, ethyl, propyl, butyl, hexyl, cyclohexyl, octyl, decyl, dodecyl, eicosyl and the like so long as the carboxylic acid ester has a boiling point above about 150 degrees C. and is liquid at room temperature.

Suitable organo-metal catalysts for the urethane formation which can be used as component D in this invention include organometal compounds of tin, zinc, lead, mercury, cadmium, bismuth, cobalt, manganese, antimony, iron and the like such as metal salts of a carboxylic acid having from 2 to 20 carbon atoms including stannous octoate, dibutyltin dilaurate, dibutyltin diacetate, ferric acetylacetonate, lead octoate, lead oleate, phenylmercuric propionate, cobalt napthenate, lead naphthenate, and mixtures thereof.

Rigid polymeric products can be prepared by rapidly mixing the components of the compositions of the present invention. It is preferred to thoroughly blend together the components represented by A, the bicyclic amide acetal, C, the modifier, and D, the catalyst and then mixing the resulting mixture with B the polyisocyanate.

Mechanical dispensing or combination mixing-dispensing devices can be employed in carrying out the process of this invention by utilizing two or more streams of the individual components or mixtures of the components which are then introduced into the forming mold or device to make the final polyurethane article.

Other ingredients including inert fillers such as sand, microballoons, glass fibers, asbestos, aluminum granules, silicon carbide powder and the like as well as coloring agents such as pigments and dyes such as chromic oxide, ferric oxide, and mixtures thereof can also be employed in the compositions of the present invention.

The process of this invention produces solid molded products which cure rapidly and may be quickly removed from the mold.

The present invention is further illustrated in the following representative examples.

EXAMPLE 1

A degassed mixture of a bicyclic amide acetal having formula I wherein R, R' and R''' are hydrogen and R'' is methyl (33 g), 15 g of dioctylphthalate and 0.2 g of 2-ethylhexanoic acid blocked 1,5-diazabicyclo(5.4.0) undec-s-ene catalyst was mixed rapidly with 76 g of degassed modified liquid methylene bis(phenyl isocyanate) (NCO equivalent weight of 144) and the clear homogeneous solution was poured into a hot mold (80 degrees C.) formed from two parallel glass plates coated with a silicone mold release agent and held apart by ⅛ inch spacers. A rapid polymerization occurred within a few seconds. The mold and its contents were then heated in an oven at 100 degrees C. for 30 minutes followed by 130 degrees C. heating for another 30 minutes. The resulting white, bubble free opaque polymer sheet was found to have a heat distortion temperature (ASTM D 648) of 122 degrees C., a notched izod impact strength (ASTM D 256) of 1.31 foot pounds/inch of notch, a flexural yield strength (ASTM D 790) of 15,064 psi and a flexural modulus of 318,887 psi.

EXAMPLE 2

This is a comparative example which is outside the scope of the present invention. The experiment was carried out in accordance with West German Pat. No. 3,235,933. A mixture of 34.8 g of 2,4-diisocyanato toluene, 11.8 g of hexanediol and 25.8 g of the bicyclic amide acetal described in Example 1 was degassed at reduced pressure. The viscous solution which resulted was poured into a mold described in Example 1 and was cured at 150 degrees C. for one hour. The resulting polymer contained many bubbles and was too brittle to measure its physical properties.

EXAMPLE 3

The procedure of Example 1 was followed using 33 g of the bicyclic amide acetal, 20 g of dioctylphthalate, 0.05 g of stannous octoate and 76 g of the diisocyanate. The final polymer sheet was found to be free of bubbles and to have a notched izod impact strength of 1.0 foot pound/inch of notch, heat distortion temperature of 128 degrees C. a flexural yield strength of 15,012 psi and a flexural modulus of 323,548 psi.

EXAMPLE 4

The procedure of Example 1 was followed using 33 g of the bicyclic amide acetal, 15 g of caprolactone, 0.05 g of stannous octoate and 76 g of the polyisocyanate. The final polymer sheet was found to have a notched izod impact strength of 1.0 foot pound/inch of notch, an unnotched izod impact strength of greater than 15 foot pounds/inch, a heat distortion temperature of 104 degrees C., a flexural yield strength of 18,544 psi and a flexural modulus of 422,183 psi.

EXAMPLE 5

The procedure of Example 1 was followed using 33 g of the bicyclic amide acetal, 15 g of tributylphosphite, 0.05 g of stannous octoate and 76.2 g of the polyisocyanate. The final polymer sheet was found to have a notched izod impact strength of 1.1 foot pounds/inch of notch, a heat distortion temperature of 111 degrees C., a flexural yield strength of 15,842 psi and a flexural modulus of 330,622 psi.

EXAMPLE 6

The procedure of Example 1 was followed using 33.1 g of the bicyclic amide acetal, 15 g of propylene carbonate, 0.05 g of stannous octoate and 76.2 g of the polyisocyanate. The final polymer sheet was found to have a notched izod impact strength of 1.56 foot pounds/inch of notch, an unnotched izod impact strength of greater than 15 foot pounds/inch, a flexural yield strength of 17,165 psi, a flexural modulus of 404,076 psi and a heat distortion temperature of 95 degrees C.

EXAMPLE 7

The procedure of Example 1 was followed using 33 g of bicyclic amide acetal, 15 g of dimethyl oxazolidone, 0.05 g of stannous actoate and 76 g of the polyisocyanate. The final polymer sheet was found to have notched izod impact strength of 0.5 foot pound/inch of notch, a heat distortion temperature of 123 degrees C., a flexural yield strength of 18,804 psi and a flexural modulus of 435,643 psi.

We claim:
1. The process for preparing a polyurethane which comprises reacting a bicyclic amide acetal conforming to the formula

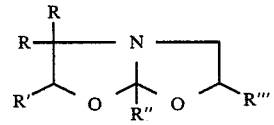

wherein R, R', R'', and R''' independently represent hydrogen, an alkyl group having from 1 to 20 carbon atoms, an aryl group having from 6 and 12 carbon atoms, an alkaryl group having from 7 to 20 carbon atoms, an alkyl ether group having from 1 to 20 carbon atoms or an aryl ether group having from 6 to 20 carbon atoms with a polysiocyanate in the presence of a plasticizer selected from the group consisting of carboxylic acid esters, organic phosphites, organic phosphates, alkylene carbonates, lactones, fatty oils, cyclic polyethers, aromatic compounds free from ester groups, partially hydrogenated aromatic compounds free from ester groups and halogenated aliphatic compounds boiling above 150° C., and a polyurethane catalyst at a temperature in the range of from about ambient temperature to about 200° C.

2. The process of claim 1 wherein the polyurethane catalyst is selected from the group consisting of organometallic catalysts and tertiary amine catalysts.

3. The process of claim 2 wherein the isocyanate to amide acetal acetal equivalent ratio is from about 0.8:1 to 3:1.

4. the process of claim 3 wherein the plasticizer is present from 2 to 50% by weight based on the combined weights of bicyclic amide acetal, polyisocyanate and plasticizer.

5. The process of claim 4 wherein the catalyst is present in from 0.01 to about 5% by weight based on the combined weights of bicyclic amide acetal, polyisocyanate and plasticizer.

* * * * *